United States Patent [19]

Schmidt

[11] Patent Number: 5,588,574
[45] Date of Patent: Dec. 31, 1996

[54] CYCLE RACK

[75] Inventor: Erik Schmidt, Herning, Denmark

[73] Assignee: Erik Schmidt Autotilbehor Aps, Herning, Denmark

[21] Appl. No.: 388,405

[22] Filed: Feb. 14, 1995

Related U.S. Application Data

[63] Continuation of Ser. No. 926,642, Aug. 10, 1992, Pat. No. 5,388,736, which is a continuation of Ser. No. 743,032, Aug. 9, 1991, abandoned.

[30] Foreign Application Priority Data

Apr. 30, 1991 [DK] Denmark ................................. 0792/91

[51] Int. Cl.$^6$ ..................................................... B60R 9/00
[52] U.S. Cl. ............................................ 224/520; 224/518
[58] Field of Search ................... 224/42.03 R, 42.03 A, 224/42.03 B, 42.06, 42.45 R, 273, 518, 520; 269/97, 201, 203, 228; 280/415.1, 512; 211/17, 18, 21, 22, 104, 195, 198; 248/434; 48/116, 122, 142, 207, 279; 160/67, 103, 154; 16/113, 221, 319, 324, 333, 346

[56] References Cited

U.S. PATENT DOCUMENTS

| | | |
|---|---|---|
| 4,336,897 | 6/1982 | Luck . |
| 4,513,897 | 4/1985 | Graber . |
| 5,004,133 | 4/1991 | Wyers ............................. 224/42.45 R |
| 5,118,020 | 6/1992 | Piretti . |
| 5,190,195 | 3/1993 | Fullhart et al. . |
| 5,228,607 | 7/1993 | Tolsdorf .......................... 224/42.03 B |

*Primary Examiner*—David J. Walczak
*Attorney, Agent, or Firm*—Antonelli, Terry, Stout & Kraus

[57] ABSTRACT

A cycle rack for carrying longitudinally extending objects including a pair of V-shaped branches connected to each other at an acute angle in a lower portion of the pair of V-shaped branches, a connecting link apparatus mutually pivotable between the pair of V-shaped branches and a gripping and holding apparatus to grip around and hold the rack on a towing hitch ball. A toggle joint apparatus between the pair of V-shaped branches holds and grips the hitch ball through the gripping and holding apparatus. The toggle joint apparatus is located at the upper end of the V-shaped branches. The cycle rack attaches to towing hitch balls having differing dimensions, achieving a fitting hole as well as achieving a further foldability of the rack. The connecting link apparatus is adapted to enable an adjustable mounting of the cycle rack on the hitch ball, and the cycle rack has optionally, at least one projecting carrying arm pivotally mounted on one of the V-shaped branches.

20 Claims, 4 Drawing Sheets

CYCLE RACK

CROSS REFERENCES TO RELATED APPLICATIONS

This application is a continuation application of U.S. application No. 07/926,642, filed Aug. 10, 1992, now U.S. Pat. No. 5,388,736 which, in turn, is a continuation of U.S. application Ser. No. 07/743,032, filed Aug. 9, 1991, now abandoned.

A cycle rack is disclosed in U.S. application Ser. No. 579,716, now U.S. Pat. No. 5,121,862 and in the International Publication No. WO 90/12704 based upon the International Patent Application No. PCT/DK90/00099.

FIELD OF INVENTION

The present invention relates to a cycle rack for carrying objects such as a bicycle, skis and the like. Additionally, the cycle rack carries accessories associated with personal or sport equipment, in which the cycle rack includes branches being approximately V-shaped and being connected to each other to form an acute angle between the branches. The lower portion of branches has connecting link means for connecting the branches and providing an adjustable space between the branches, and the connecting link means are pivotable. The cycle rack includes, between the V-shaped branches, a gripping and holding means for gripping and holding the rack on a ball towing hitch or other means to carry the rack which has been mounted on an automobile. The gripping and holding means grips or squeezes the ball towing hitch between the branches of the V-shaped branches producing a gripping and holding force by a toggle joint means connecting the upper portion of the branches.

BACKGROUND OF THE INVENTION

A cycle rack of the aforementioned is illustrated in FIG. 1, with the cycle rack including a ball 1 of a towing hitch of an automobile. The two protruding arms 2A and 3A for carrying at least one bicycle or for supporting skis vertically are located on the upper portion of the V-shaped branches 3 and 4. The lower ends of the skis are supported by a basket shaped supporting means (not shown) attached to the lower portion of the cycle rack.

This type of cycle rack has the disadvantage that it may be necessary to manufacture and market more than just one size of the cycle rack for practical reasons. This disadvantage is not caused by various sizes of bicycles or skis, but is caused by the size of the ball hitch. The dimensions of the ball should comply with a world-wide-accepted, one-size-standard ball hitch which includes a minimum and maximum dimensional tolerance resulting from manufacturing deviations when producing the ball. Nevertheless, the tolerance of the ball hitch is not sufficiently strictly observed everywhere although the ball size is world-wide-accepted.

Additionally, a certain amount of wear of the ball also must be taken into account.

The prior art of FIG. 1 further comprises V-shaped oblique branches 2, 3 which include protruding and projecting carrying arms 2A and 3A at upper ends of the V-shaped oblique branches adapted to carry at least one bicycle, a pair of skis or other lengthy object. Connecting means 71 to maintain spacing between the branches 2 and 3 are located at the lower portion of the V-shaped carrying branches 2 and 3 in which connecting link means 7 permit swinging or pivoting about pivot points 71 and 72 of one branch with respect to the other branch. Two gripping and holding means 8A and 8B are located below the connecting link means and are mounted at the lower end of the V-shaped oblique branches 2 and 3. When the lower ends of the V-shaped oblique branches 2 and 3 are opened in a direction away from each other, the two gripping and holding means 8A and 8B are moved away from each other so that each of the gripping and holding means can clamp the ball 1 at diametrically opposite sides of ball 1 which is mounted to a towing hitch located at the rear of an automobile for towing a trailer or caravan behind the automobile. The gripping and holding means 8A, 8B can be brought to be a seated fitted position by the tensioned closing of the lower ends of the carrying branches 2 and 3 on the ball 1 and safely holding the rack in position thereupon enabling the rack to carry bicycles, skis and other lengthy objects when it is fittingly positioned on the ball 1. An upwards facing open basket-shaped means (not shown) located at the lower portion of branches 2 and 3 near the link means and below the carrying arms 2A and 3A supports the lower ends of the lengthy objects such as skis to be carried. The objects are vertically supported within the rack at a higher portion of the branches 2, 3 against the carrying arms 2A and 3A. A rack for carrying bicycles can thus easily be equipped so it carries long objects such as skis.

The branches 2 and 3 are mutually held in a closed position by a toggle joint means which includes two parallel link arms 4, 5 which in the closed position provides stretch and tension between branches 2 and 3. A locking and holding mechanism 6 is located near the middle of the toggle joint means in a stretched and tensioned position. After closing this locking and holding mechanism, the toggle joint means can be opened by an upward movement of the holding mechanism of the toggle joint means with the tension position being changed to an open position. The upper ends of the arms 4 and 5 are moved towards each other, and the holding mechanism 6 is pulled upwards by the handle portion 6H. An opening 40 is for insertion of an additional securing pin. The bearings 41 and 51 are provided for enabling the pivotal movement of the branches 2, 3. A pivot 45 connects the two arms 4 and 5.

The toggle joint means provides tension between branches 2 and 3 at bearings 41 and 51 thereby enabling the lower portions of branches 2, 3 through holding means 8A and 8B to squeeze different sized balls which exhibit somewhat different dimensions.

SUMMARY OF THE INVENTION

Accordingly, two sizes of the aforementioned gripping and holding means have been proposed to eliminate the problem of wear and to ensure that the rack fits on the particular ball of the towing hitch when used for carrying the cycle rack. On the other hand, it would be advantageous if it was possible to inspect the ball hitch and determine from the inspection if the cycle rack fits a particular ball of the ball hitch. It is easily understood that it is difficult to achieve this objective through marking either the rack of or the ball with information about their sizes. The dimensional differences of the ball hitches are too small to be easily distinguishable by a visual inspection.

It is desirable to provide an optional feature of the cycle rack which makes it possible to fold the cycle rack, without dismantling the cycle rack, into a shape so that the cycle rack occupies a smaller space than the illustrated rack of the prior art and that the cycle rack can be packed in a package or into a box for transportation.

The above and other purposes are, according to the invention, attainable, without the rack having to be disassembled for transportation. The connecting link means includes shape changing means, and at least one of the V-shaped branches of the rack optionally includes at least one of the protruding or projecting carrying arms. This arm pivots around at least one pivot axis to pivotally mount the arm on the branch that includes the arm.

The connecting link means which is reshapeable by mechanical readjustment to adjust the space between the V-shaped branches includes a feature which ensures a tension force between the gripping holding means and the ball of the ball hitch; this connecting link means achieves the tension force despite large tolerance deviations of the ball hitch. On the other hand, it is advantageous that only two values of the tension force are applied to the ball. However, these two values are obtained with adjustment of the shape changing means so that only two tension readjustment positions selectively are obtainable by reshapeability; therefore, only these two values of the tension force provide a tensional range enabling the cycle rack to be fitted securely on any of the slightly different dimensioned balls of the ball hitches. This advantage is a mechanically simple solution, and also the reshapeable spacing of the connecting link means is achieved by the connecting link means which includes adjusting screw means.

Another feature, according to the invention which is able to cover the same range of tension without any necessary adjustment is provided by the reshapeable link means which is at least one wave-shaped elastic connecting link means. This feature is for instance provided by the connecting link means comprising two parallel ribbon or rod shaped connecting link means of which one or both of the parallel ribbon or rod shaped connecting link means are wave-shaped. This solution according to the invention provides a solution to the problem of differing ball dimensions which functions well. As an alternative, a cycle rack exhibiting a combination of the mentioned features is used; this contribution is advantageous if the cycle rack is used with a variety of differing dimensions of ball hitches.

The cycle rack is additionally easily packed for transportation to a sales dealer or for storing the cycle rack in stock by pivoting the carrying arms mounted onto the V-shaped arranged branches. Pivoting the carrying arms arranged in parallel besides each other with the flat sides of the V-shaped carrying arm pushed against each other and with another rack having the direction of its V-shape of the branches opposingly oriented allows the packing or transportation of more than one of these cycle racks. A very tight stacking arrangement for the racks is attained in this way.

A further feature according to the invention comprises an annular or eyelet means to be connected to each of the carrying arms so that a carrying means is provided on at least one side of the carrying arm and runs substantially longitudinally along the side of the carrying arm, and whereby this carrying means on at least one side comprises at least one annular or eyelet gripping means for the gripping of a mounting member of bicycles, skis and the like. A further feature of this carrying means is that it is removably mounted on the carrying arm by holding means. A feature of the holding means that it is a U-shaped.

An additional feature is the annular or eyelet means which can further be provided with locking means to prevent accidental removal or theft of the carrying means and of the attached bicycles or skis or other objects to be carried by the cycle rack. The carrying arms of the cycle rack includes complementary means for receiving these carrying means or objects to be carried by the cycle rack.

The carrying means according to a further feature of the invention includes at least one branch gripping means which is able to grip the V-shaped branch carrying the carrying arm, when this carrying arm is pivoted to occupy a position in which it is able to carry bicycles, skis and other objects to be carried by the rack, and the at least one branch gripping means keeps the carrying arm in this position by holding onto the carrying branch. Consequently, the carrying arms can be safely maintained in the position for carrying the objects to be carried by the rack.

BRIEF DESCRIPTION OF THE DRAWINGS

Elements having the same or substantially same function in the drawings have the same reference numeral.

DETAILED DESCRIPTION OF THE PREFERRED EMBODIMENTS

Figure 1:
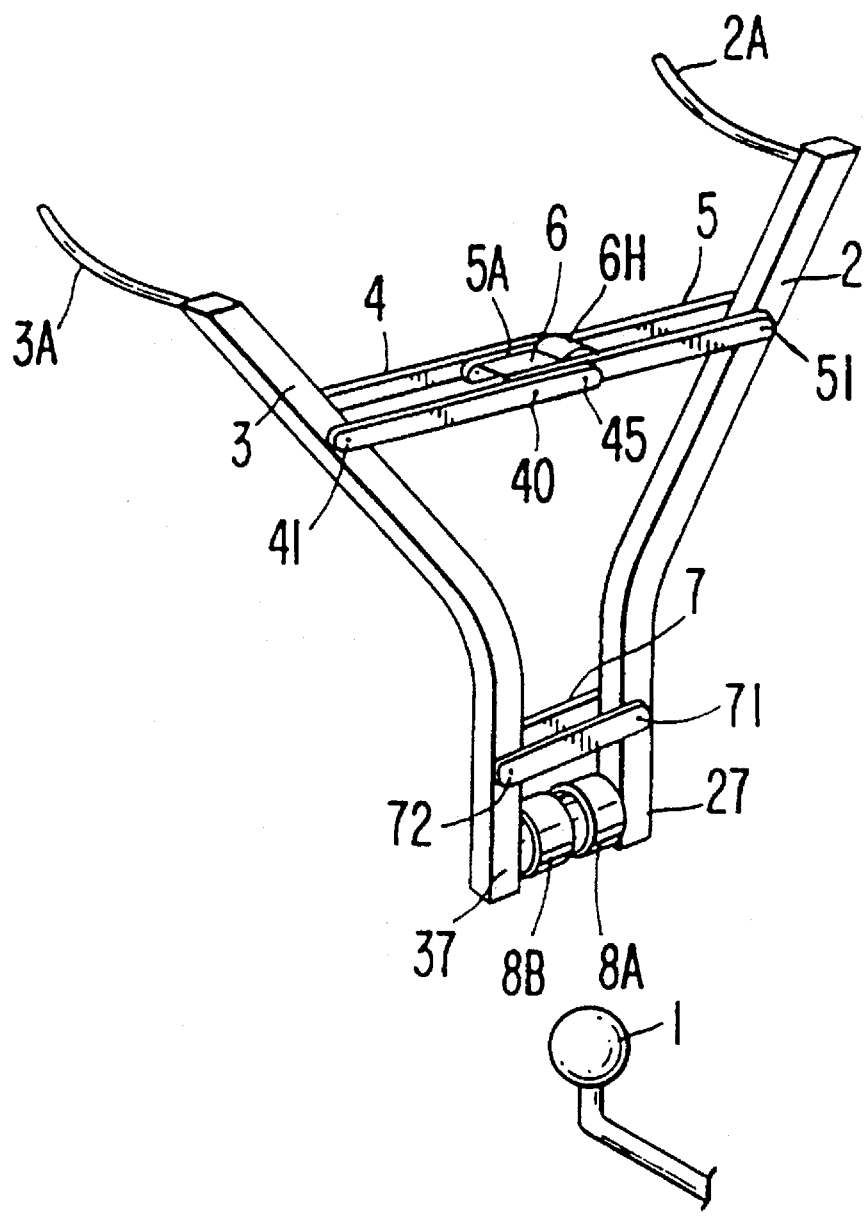
FIG. 1 illustrates a schematic perspective view of a prior art cycle rack including a ball of a towing ball hitch on which the illustrated rack can be fittingly seated and carried.
Figure 2:
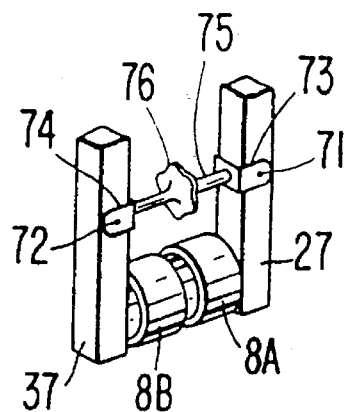
FIG. 2 is a schematic perspective view illustrating a connecting link means which is reshapeable and readjustable according to the invention.

In accordance with the present invention, as shown in FIG. 2, the connecting link means 7 includes a screw means 75 including a threaded member for threading a manually rotatable readjustment button 76 having a threaded hole; the threaded member is connected to a clamping means 73.

The readjustment button 76 opposed to the screw means 75 is rotatably connected through a bearing to another clamping means 74. The clamping means 73, 74 are rotatably connected through bearings to the lower ends 27, 37 of the branches 2 and 3 by bearings 71, 72. It is possible to adjust the spacing between the lower ends 27 and 37 by rotation of the readjustment button 76 to adjust for different dimensional balls.

Figure 3:
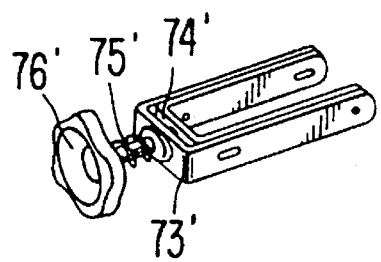
FIG. 3 is a schematic perspective of a connecting link means which is reshapeable and adjustable as arranged on the cycle rack illustrated in FIG. 4.
Figure 4:
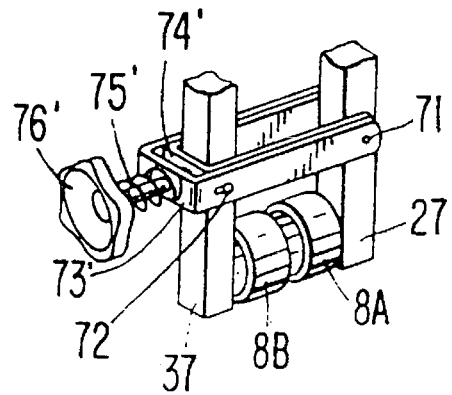
FIG. 4 is a schematic perspective view of the connecting link means as illustrated in FIG. 3 arranged on a cycle rack.

As shown in FIGS. 3 and 4, the connecting link means is reshapable and is shown mounted within a rack. Similar to the connecting link means of FIG. 2, a screw means 75' including a fixed connected readjustment button 76' connected to the screw means 75' and a threaded member is threadably accommodated by a threaded hole in a first clamping means 73' and further is pressed so as to contact against a second clamping means 74'. The two clamping means 73' and 74' include through holes for bearing pins 71 and 72 serving to hold the respective clamping means in position with respect to the V-shaped oblique branches 2 and 3 as shown in FIG. 4.

As shown in FIG. 3, the through holes for the bearing pins 71, 72 are shaped as oblong holes in alignment with the bearing pins 71 and 72 which, in FIG. 3, are located to the left of the clamping means 73 and which in FIG. 4, are located to the right of the clamping means 74'. By rotation of the screw means 75', the spacing between the lower ends 27 and 37 of branch 2, 3 is adjusted, with a maximum size of adjustment being determined by the size of the oblong holes in the longitudinal direction. A suitably strong spring means or any other type of a rotation counteracting means can be arranged as illustrated to hold the screw means 75' in a given position so that the force between the bearing pins 71 and 72 do not result in a change in the position of the screw means 75'.

Figure 5:
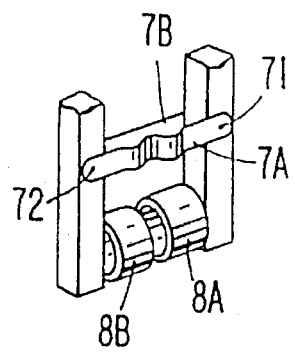
FIGS. 5 and 6 illustrate a schematic perspective view according to the invention of a connecting link means which is reshapeable and elastic.
Figure 6:
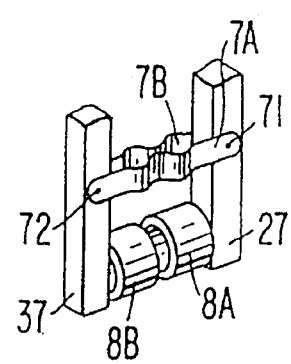

Another feature is illustrated in FIGS. 5 and 6, wherein the connecting link means 7A or the connecting link means 7B or both the connecting link means 7A, 7A include a wave-shaped or ribbon-shaped member which is elastic and resilient and define resilient means. The length and the elasticity of this ribbon shaped or elastic resilient means provides a suitable tensioning force exerted on the lower ends 27 and 37 of branches 2, 3 to clamp 8A and 8B against the ball 1.

Figure 7:
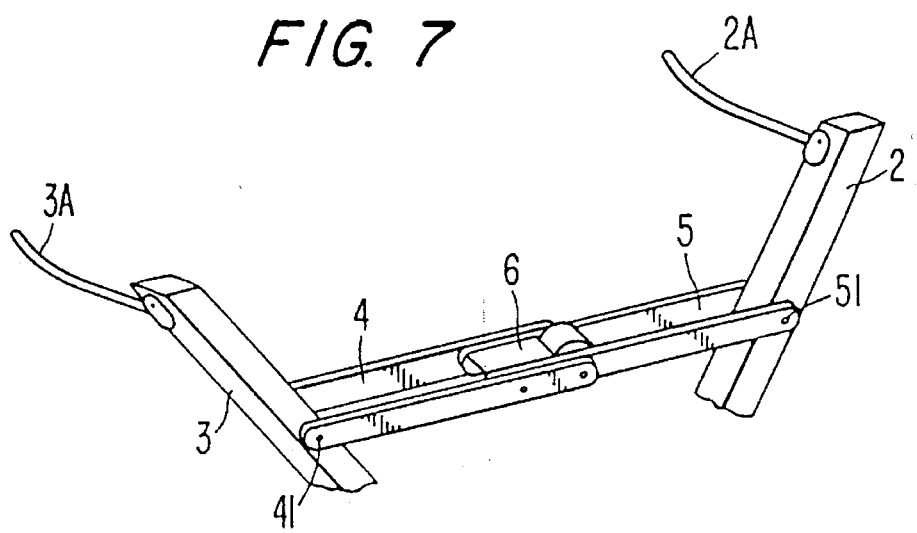
FIGS. 7 and 8 illustrate a schematic perspective view of carrying arms in a ready-to-carry position and in a folded away position.
Figure 8:
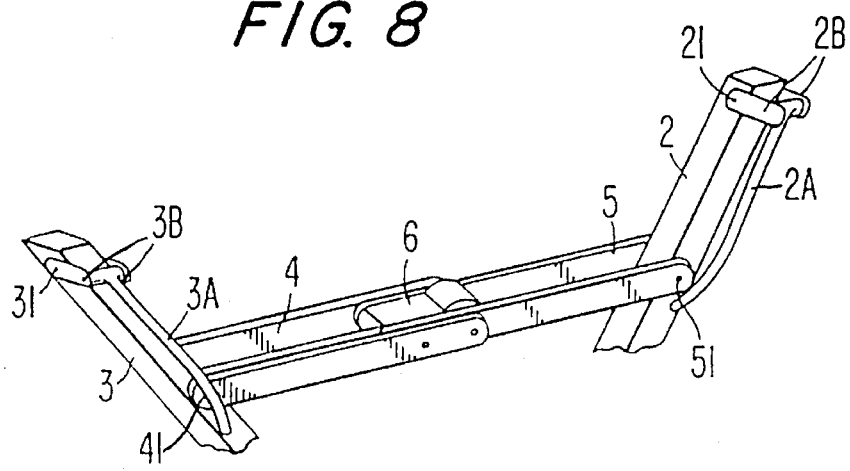

FIGS. 7 and 8 illustrate the feature for clamping the carrying arms 2A, 3A, whereby these arms 2A, 3A are mounted to a clamp shaped means 2B, 3B, which pivots with respect to and clamps to V-shaped oblique branches 2 and 3 and includes pivot bearing 21 and 31 to pivot on V-shaped branches 2, 3.

As illustrated in FIG. 7, the carrying arms 2A, 3A are extended to positions for carrying objects such as bicycles or skis, and, as illustrated in FIG. 8, the carrying arms 2A, 3A are at pivoted positions substantially parallel to the branches 2 and 3.

Figure 9:
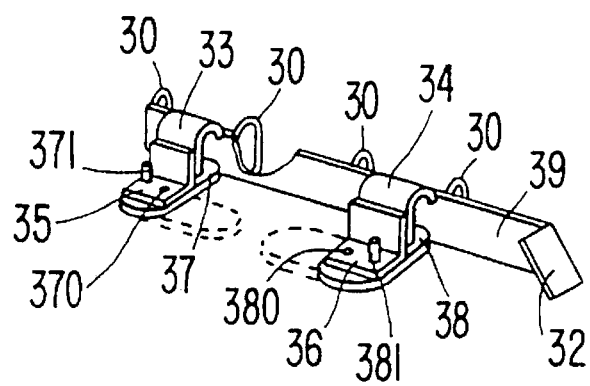
FIG. 9 illustrates a schematic perspective view of an auxiliary carrying and locking means to be mounted on the carrying arms to provide auxiliary holding means for retaining extended objects like skis to the carrying arms of the rack and for locking the carrying arms when they are pivoted down to occupy ready-to-carry positions.
Figure 10:
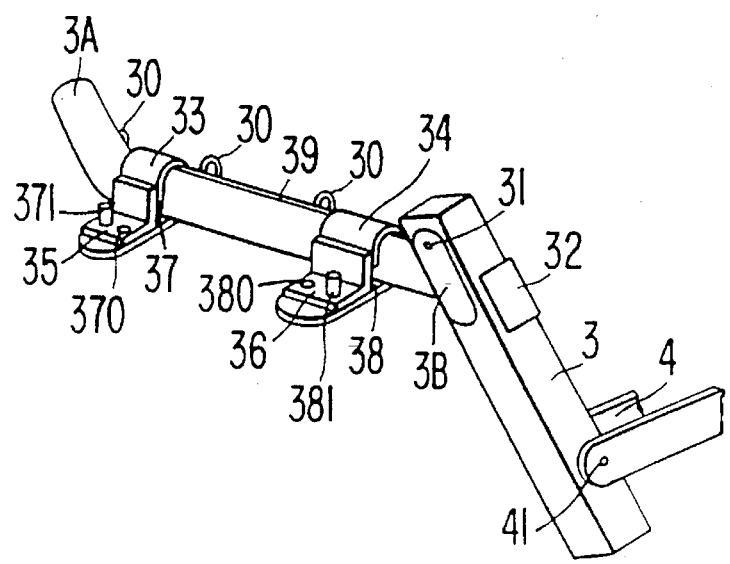
FIG. 10 illustrates a schematic perspective view of the auxiliary means according to FIG. 9 mounted on a carrying arm with the carrying arm 3A of the rack.

A further feature of the invention shown in FIGS. 9 and 10, is an auxiliary carrying and locking means mounted on the carrying arms 3A of the cycle rack. A corresponding auxiliary carrying and locking means for the carrying arm 2A is featured and shaped to complement the shape of the carrying arms. The auxiliary carrying and locking means is provided with annular, eyelet holding means 30, of which four annular shaped holding means 30 are shown in FIG. 9, whereby the mutual spacing between each of the holding means, for example, corresponds to the width of a ski for supporting skis between the individual holding means mounted onto a length of flat iron ribbon member 39. The annular eyelet holding means 30 can be used to receive the fastening hooks located on the ends of binding girdles or similar means which are used for binding skis together. The angled or angular profile member 35 and 36 with pins 371 and 381 function as bearings for rotary clamping means or flat iron means 37 and 38. The angular profiled members 35 and 36 and flat iron means 37 and 38 can be rotated outwardly to occupy the positions shown in dotted lines in FIG. 9. In this position, the complete auxiliary carrying and locking means can either be lifted away from or mounted on the carrying arms 3A. As shown in FIGS. 9 and 10, the angled projection 32 is located at the end of the flat iron ribbon member 39. When mounting the auxiliary carrying and locking means on the carrying arm the angled projection 32 is turned away, whereby the angled projection 32 is positioned at the right hand side of the branch 3 as shown in FIG. 10. After being mounted in the position shown in FIG. 10, the flat iron ribbon member 39 is locked in position by the rotary clamping of flat iron means 37 and 38 as described above, and the angled projection 32 rests, locking against the front of branch 3 as shown in FIG. 10. This prevents a swinging back of the carrying arm 3A. For example, a padlock can be inserted into the through holes 370 and 380 or a suitable locking wire can be inserted into the through holes 370, 380 and around the objects to be carried by the cycle rack thus preventing theft of these objects.

Skis or other lengthy objects to be carried by the rack can be supported at the lower end of the rack by a suitable basket means mounted there. Such a basket means can internally or externally be provided with annular or eyelet means 30 so as to improve the holding of the lengthy objects.

I claim:

1. A cycle rack for carrying a longitudinally extending object, the cycle rack comprising:

a pair of branches connected to each other at an acute angle at a lower portion thereof so as to be mutually pivotable with respect to each other; and gripping and holding means for enabling a gripping and holding of the cycle rack on a towing ball hitch;

wherein each of the pair of branches includes at least one carrying arm being mounted on said branch pivotally about a pivot axis extending through said branch in direction of the other branch in the pair of branches, so that the carrying arm is pivotable to occupy a carrying position, wherein said carrying arm has an inner most portion which is angle shaped and supports a carrying portion of the carrying arm, said carrying portion having an inner end portion which in a carrying position of the carrying arm is positioned at said branch at a lower level than said pivot axis, so that said carrying arm is pivotable from the carrying position up above a top of said branch.

2. A cycle rack according to claim 1, wherein said at least one carrying arm is provided with a carrying means having at least one eyelet gripping means for gripping of a mounting member of the longitudinally extending object.

3. A cycle rack according to claim 2, wherein said carrying means is removably mounted on said at least one carrying arm.

4. A cycle rack according to claim 1, further comprising at least one branch gripping means adapted to grip said branch carrying said at least one carrying arm when this carrying arm is in the carrying position, and to retain said carrying arm in the carrying position.

5. A cycle rack for carrying an object, the cycle rack comprising:

a pair of branches having upper and lower portions;

a connecting link means connecting the branches in said pair of branches to each other at the lower portions thereof so as to be pivotable with respect to each other;

gripping and holding means for enabling a gripping and holding of the cycle rack on a towing ball hitch, said gripping and holding means being mounted at the lower portions of the branches below the connecting link means at opposite sides of said towing ball hitch;

a toggle joint means interconnecting said branches above said connecting link means; and one carrying arm for carrying said object mounted on each of said branches, said lower portions of said pair of branches being movable towards each other by placing said toggle joint means in a position pressing said upper portions of said branches apart so that said gripping and holding means squeeze said towing ball hitch; and wherein said carrying arm on each of said branches is pivotally mounted on said branch so as to be upwards and downwards swingable between two positions, one of which is a carrying position where the arm projects out from said branch and the other of which is a folded position where the arm extends along said branch.

6. A cycle rack according to claim 5, wherein downwards swinging of said carrying arm is prevented when it occupies the projecting carrying position.

7. A cycle rack according to claim 6, further including at least one branch gripping means for keeping said carrying arm in the projecting carrying position.

8. A cycle rack according to claim 5, wherein said carrying arm is mounted on one branch of said pair of branches by a pivot bearing having a pivot axis which extends in the direction of the other branch of said pair of branches.

9. A cycle rack according to claim 8, wherein said carrying arm is mounted to a clamp shaped means which connects said arm with said pivot bearing so that an innermost portion of said carrying arm is positioned at a lower level than said pivot bearing, when said carrying arm is pivoted about said pivot axis to occupy said carrying position, and so that said carrying arm is pivotable about said pivot axis from said carrying position up above a top of said branch.

10. A cycle rack according to claim 5, wherein said at least one carrying arm is provided with a carrying means having at least one eyelet gripping means for gripping of a mounting member of said object.

11. A cycle rack according to claim 10, wherein said carrying means is removably mounted on said at least one carrying arm.

12. A cycle rack according to claim 5, wherein each branch extends in a longitudinal direction, and said carrying arm is pivotally mounted on the one branch of said pair of branches about a pivot axis which extends through the branch in the direction of the other branch of said pair of branches, and wherein said carrying arm includes a clamp shaped means extending to said pivot axis so that an innermost portion of said carrying arm is positioned at a distance in the longitudinal direction of said branch from said pivot axis, when said carrying arm occupies said carrying position.

13. A cycle rack for carrying an object, the cycle rack comprising:

a pair of quadrangular branches each having an upper portion extending in a longitudinal direction and each having four sides whereof a first side faces towards the other branch in said pair, a second side faces backwards, a third side faces forwards and a fourth side faces away from said other branch, said branches being connected to each other through a connecting link means at lower portions of the branches so as to be mutually pivotable with respect to each other;

gripping and holding means mounted at the lower portions of the branches for enabling a gripping and holding of the cycle rack on a towing ball hitch;

a toggle joint means connecting said branches above said connecting link means, said branches being arranged at an acute angle when the gripping and holding means grip the towing ball hitch;

wherein each of the branches includes at least one carrying arm mounted on said branch pivotally about a pivot axis extending through said first and fourth sides of said branch in direction of the other branch in the pair of branches; and wherein said carrying arm has an end portion with a clamp shaped means having two side pieces, the first of which extends to said pivot axis on said first side of the branch and the second of which extends to said pivot axis on said fourth side of the branch, so that said carrying arm is pivotable from a carrying position, in which the carrying arm extends out backwards from said second side of the branch, and pivots about said pivot axis to a position, in which the carrying arm extends along said branch.

14. A cycle rack according to claim 13, wherein said end portion of the carrying arm has an upper side for supporting said object, and said two side pieces of the clamp shaped means extend to said pivot axis so that the upper side of said carrying arm is positioned at a level crossing the longitudinal direction of said branch at a distance from said pivot axis, when said carrying arm occupies said carrying position.

15. A cycle rack according to claim 13, wherein said carrying arm is pivotable up above a top of said branch to a position along said third side of the branch.

16. A cycle rack according to claim 13, wherein said carrying arm is pivotable about said pivot axis in upwards and downwards directions.

17. A cycle rack according to claim 13, wherein said at least one carrying arm is provided with a carrying means having at least one eyelet gripping means for gripping of a mounting member of said object.

18. A cycle rack according to claim 17, wherein said carrying means is removably mounted on said at least one carrying arm.

19. A cycle rack according to claim 13, wherein the carrying position of said carrying arm is lockable.

20. A cycle rack according to claim 13, further including at least one branch gripping means for keeping said carrying arm in the carrying position.

\* \* \* \* \*